United States Patent
Pizlo et al.

(10) Patent No.: US 10,713,021 B2
(45) Date of Patent: Jul. 14, 2020

(54) GEOMETRIC 64-BIT CAPABILITY POINTER

(71) Applicant: Apple Inc., Cupertino, CA (US)

(72) Inventors: Filip J. Pizlo, Capitola, CA (US); Oliver J. Hunt, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/147,336

(22) Filed: Sep. 28, 2018

(65) Prior Publication Data

US 2019/0272159 A1 Sep. 5, 2019

Related U.S. Application Data

(60) Provisional application No. 62/638,798, filed on Mar. 5, 2018.

(51) Int. Cl.
| | |
|---|---|
| *G06F 9/45* | (2006.01) |
| *G06F 8/41* | (2018.01) |
| *G06F 9/30* | (2018.01) |
| *G06F 9/50* | (2006.01) |

(Continued)

(52) U.S. Cl.
CPC .......... *G06F 8/434* (2013.01); *G06F 9/30181* (2013.01); *G06F 9/5016* (2013.01); *G06F 9/5077* (2013.01); *G06F 12/0292* (2013.01); *G06F 12/145* (2013.01); *G06F 2212/1041* (2013.01); *G06F 2212/1052* (2013.01)

(58) Field of Classification Search
CPC ...... G06F 8/34; G06F 9/30181; G06F 9/5077; G06F 9/5016; G06F 12/0292; G06F 12/45
See application file for complete search history.

(56) References Cited

U.S. PATENT DOCUMENTS

| | | |
|---|---|---|
| 5,210,874 A | 5/1993 | Karger |
| 5,845,331 A | 12/1998 | Carter et al. |
| 6,049,667 A | 4/2000 | Bates |

(Continued)

FOREIGN PATENT DOCUMENTS

WO 2017/032969 A1 3/2017

OTHER PUBLICATIONS

Title: Protection traps and alternatives for memory management of an object-oriented language, author: Al Hosking, published on 1994.*

(Continued)

*Primary Examiner* — Chameli Das
(74) *Attorney, Agent, or Firm* — Jaffery Watson Mendonsa & Hamilton LLP (57) ABSTRACT

One embodiment provides for a computer-implemented method comprising receiving a request to compile a set of program instructions coded in a high-level language, the set of program instructions including a pointer to a virtual memory address, the pointer having a pointer encoding including a base address and a length; while compiling the set of program instructions, decoding the base address and length from the pointer, wherein the base address specifies a first boundary for a memory allocation, the length defines a second boundary for the memory allocation and the length is an encoding of a size of the memory allocation; and generating a set of compiled instructions which, when executed, enable access to a physical address associated with a virtual address between the first boundary and the second boundary.

17 Claims, 10 Drawing Sheets

(51) Int. Cl.
*G06F 12/14* (2006.01)
*G06F 12/02* (2006.01)

(56) References Cited

U.S. PATENT DOCUMENTS

| | | | | |
|---|---|---|---|---|
| 6,313,766 | B1* | 11/2001 | Langendorf | H04N 19/61 341/65 |
| 6,658,578 | B1* | 12/2003 | Laurenti | G06F 5/01 712/244 |
| 6,826,672 | B1 | 11/2004 | Brown et al. | |
| 2006/0047883 | A1* | 3/2006 | O'Connor | G06F 12/0864 711/3 |
| 2010/0293342 | A1* | 11/2010 | Morfey | G06F 9/30032 711/154 |
| 2011/0179246 | A1* | 7/2011 | Kim | G06F 12/0292 711/170 |
| 2012/0265916 | A1* | 10/2012 | Nordstrom | G06F 13/28 710/308 |
| 2013/0238884 | A1* | 9/2013 | Musha | G06F 11/0778 713/2 |
| 2016/0170910 | A1* | 6/2016 | Inamdar | G06F 12/1475 711/163 |
| 2016/0321071 | A1* | 11/2016 | Hansen | G06F 9/4484 |
| 2016/0378679 | A1* | 12/2016 | Cintra | G06F 12/1009 711/206 |
| 2018/0059981 | A1* | 3/2018 | Gschwind | G06F 12/0615 |
| 2018/0322386 | A1* | 11/2018 | Sridharan | G06N 3/08 |
| 2019/0220281 | A1* | 7/2019 | Gschwind | G06F 8/434 |
| 2019/0265976 | A1* | 8/2019 | Goryavskiy | G06F 12/10 |

OTHER PUBLICATIONS

Title: Stack Bounds Protection with Low Fat Pointers, author: Gregory J. Duck et al, published on 2017.*
Title: Fat Pointers, author: Arjun Merron, published on 2006.*
Watson, Robert N. M. et al. "Capability Hardware Enhanced RISC Instructions—CHERI Instruction—Set Architecture (Version 5)", Technical Report, No. 891, Cambridge University Computer Laboratory, United Kingdom, Jun. 2016, 242 pgs.
PCT/US2019/012288, International Search Report & Written Opinion, dated Mar. 25, 2019, 14 pgs.
Watson, Robert N. M., et al., "CHERI: A Hybrid Capability-System Architecture for Scalable Software Compartmentalization", 2015 IEEE Symposium on Security and Privacy, DOI 10.1109/SP.2015.9, 18 pgs.
Woodruff, Jonathan, "The CHERI capability model: Revisiting RISC in an age of risk", 2014, 12 pgs.

* cited by examiner

GEOMETRIC 64-BIT CAPABILITY POINTER

CROSS-REFERENCE

This application claims priority to U.S. Provisional Patent Application No. 62/638,798 filed Mar. 5, 2018, which is hereby incorporated herein by reference.

TECHNICAL FIELD

This disclosure relates generally to the field of data processing technology, and more specifically to a capability model for enabling pointer safety within a general-purpose data processing system.

BACKGROUND OF THE DISCLOSURE

Capability-based addressing is a memory access technique that can be used to control access to memory within a computing system. In capability-based addressing, pointers are replaced by objects referred to as capabilities, which include some set of restrictions on the type of memory accesses that can be performed using the capability object, enabling the processor or kernel to control which processes may access which objects in memory. CHERI (Capability Hardware Enhanced RISC Instructions) is an extension of RISC Instruction Set Architectures (ISAs) to enable capability-based primitives. However, capability enhanced RISC ISAs known in the art make use of large pointers that can result in object file sizes that may be impractical for general-purpose use, particularly in mobile or handheld computing devices in which storage device and memory capacity may be constrained.

SUMMARY OF THE DESCRIPTION

Embodiments described herein provide hardware and software logic to enable a capability enhanced data processing system in which access to memory allocations are checked against a set of capabilities defined for the memory allocation. Capability enhanced pointers having a reduced size relative to existing capability enhanced hardware systems by encoding the size of the allocated memory region using a reduce number of bits.

One embodiment provides for a computer-implemented method comprising receiving a request to compile a set of program instructions coded in a high-level language, the set of program instructions including a pointer to a virtual memory address, the pointer having a 64-bit pointer encoding including a base address and a length; while compiling the set of program instructions, decoding the base address and length from the pointer, wherein the base address specifies a first boundary for a memory allocation, the length defines a second boundary for the memory allocation and the length is an encoding of a size of the memory allocation; and generating a set of compiled instructions which, when executed, enable access to a physical address associated with a virtual address between the first boundary and the second boundary.

In one embodiment, the length is encoded as an index to a table of memory allocation sizes, where the memory allocation sizes include a geometric progression of allocation sizes. In one embodiment the table of memory allocation sizes is encoded into hardware of a processor configured to execute the set of compiled instructions. The 64-bit pointer encoding can additionally include a set of permissions associated with the pointer. The permissions can define a set of memory accesses that can be performed using the pointer. In one embodiment, generating the set of compiled instructions additionally includes generating one or more instructions to limit the type of memory access available via the pointer.

One embodiment provides for data processing system comprising a non-transitory machine-readable medium storing a first set of instructions one or more processors to execute the first set of instructions, wherein the first set of instructions, when executed, cause the one or more processors to perform operations including receiving a request to compile a second set of instructions coded in a high-level language, wherein the second set of instructions include a pointer to a virtual memory address, the pointer having a 64-bit pointer encoding including a base address and a length; while compiling the second set of instructions, decoding the base address and length from the pointer, wherein the base address specifies a first boundary for a memory allocation, the length defines a second boundary for the memory allocation, and the length is an encoding of a size of the memory allocation; and generating a set of compiled instructions which, when executed, enable access to a physical address associated with a virtual address between the first boundary and the second boundary.

One embodiment provides for a computing device comprising a memory device coupled with a bus and one or more processors coupled with the bus. At least one of the one or more processors includes an execution pipeline and a capability pipeline, the capability pipeline to control access to data stored in the memory device for an instruction configured to execute on the at least one processor, the instruction compiled to access the memory device based on a pointer having a 64-bit pointer encoding including a base address and a length, the base address to specify a first permitted boundary for a memory allocation based on the pointer and the length to specify a second boundary for the memory allocation based on the pointer, the length including an encoding of a size of the memory allocation.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which.

DETAILED DESCRIPTION

Reference in the specification to "one embodiment" or "an embodiment" means that a feature, structure, or characteristic described in conjunction with the embodiment can be included in at least one embodiment of the invention. The appearances of the phrase "in one embodiment" in various places in the specification do not necessarily all refer to the same embodiment.

The processes depicted in the figures that follow can be performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described may be performed in a different order. Moreover, some operations may be performed in parallel rather than sequentially.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1, while an element having a reference number between 200 and 299 is first shown in FIG. 2, etc. Within a description of a given figure, previously introduced elements may or may not be referenced.

Figure 1:
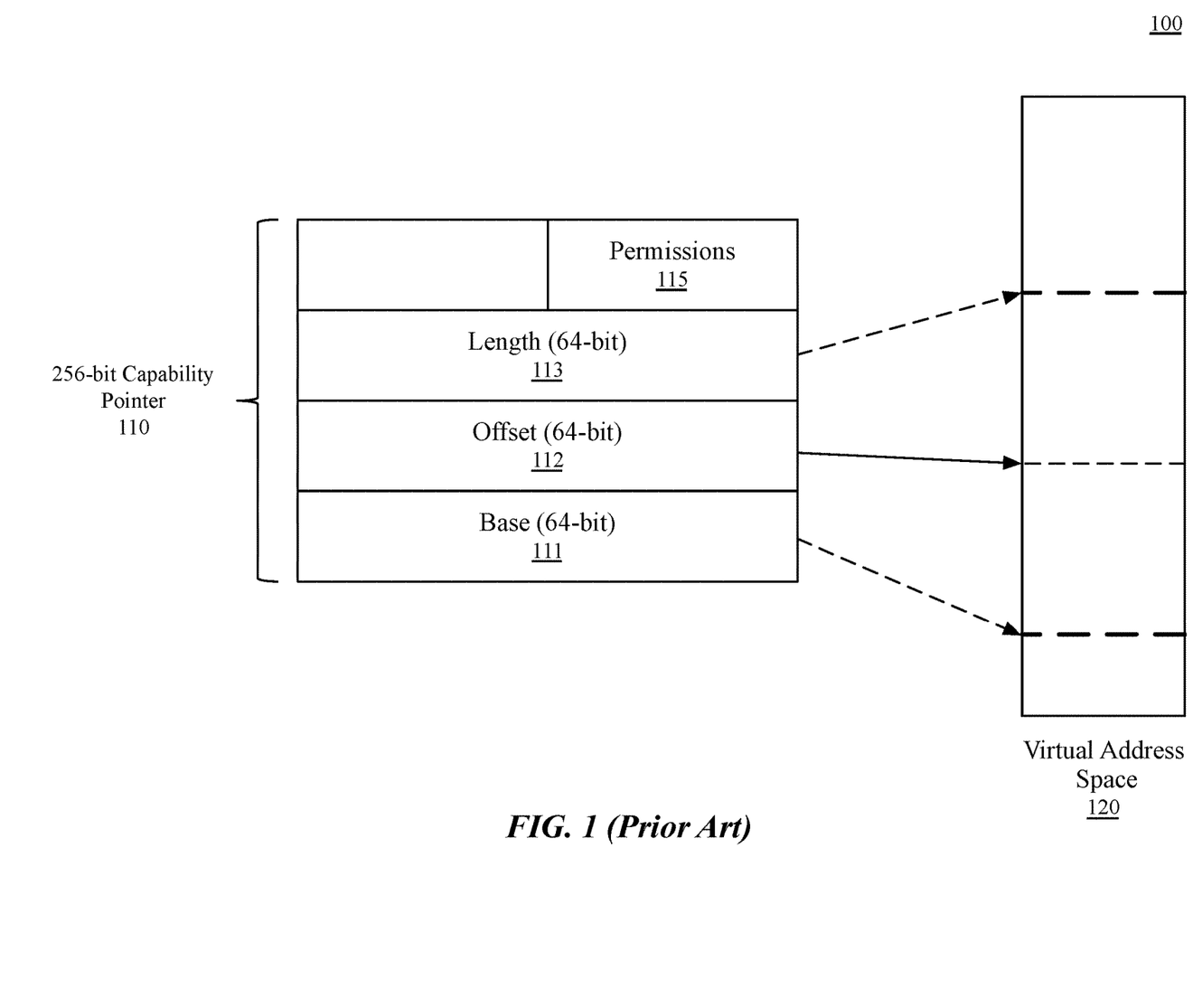
FIG. 1 illustrates a capability pointer system known in the art.

FIG. 1 illustrates a capability pointer system 100 known in the art. The illustrated capability pointer system 100 is used in a variant of the CHERI extended RISC ISA. In the capability pointer system 100, each pointer is a 256-bit capability pointer 110 that includes a base pointer 111, an offset pointer 112, and a length pointer 113, which are each 64-bit pointers. Each of the 64-bit pointers references a region in a virtual address space 120 of a data processing system, with the base pointer 111 specifying the lower bound of an allocation in the virtual address space 120, the offset pointer 112 specifying a currently referenced address, and the length pointer 113 specifying the upper bound of the allocation in the virtual address space 120. A permissions region 115 is also included to define the access permissions that the 256-bit capability pointer 110 can exercise. The length of the permissions region can vary, along with the specific permissions that can be specified. A drawback of the illustrated 256-bit capability pointer is that compiled object files using such pointers will be expanded fourfold. This expansion in storage and memory footprint can be problematic for some computing devices, such as mobile, embedded, or handheld computing devices in which memory or storage space may be constrained.

Described herein is a geometric 64-bit capability pointer that can be implemented in processing systems to enable reduced footprint capability aware processing. The geometric 64-bit capability pointer can enable bounds checking capability for memory accesses without an increase in the footprint of object files relative to systems having conventional 64-bit pointers. The geometric 64-bit capability pointer can also include a set of bits that define permissions, which can be used to restrict the type of memory accesses that can be performed using the 64-bit capability pointer. The geometric 64-bit capability pointer can be provided via a software library that enables capability aware processing on processing systems without hardware support for capability-based memory access. One embodiment provides a processing system that includes hardware support for the geometric 64-bit capability pointer. The reduced footprint of the geometric 64-bit capability pointer is enabled in part by using a 48-bit base pointer and enabling a length of size of a memory allocation to be specified using an encoded length. In one embodiment, the encoded length references a table of memory allocation sized that are based on a geometric progression of allocation sizes.

Figure 2:
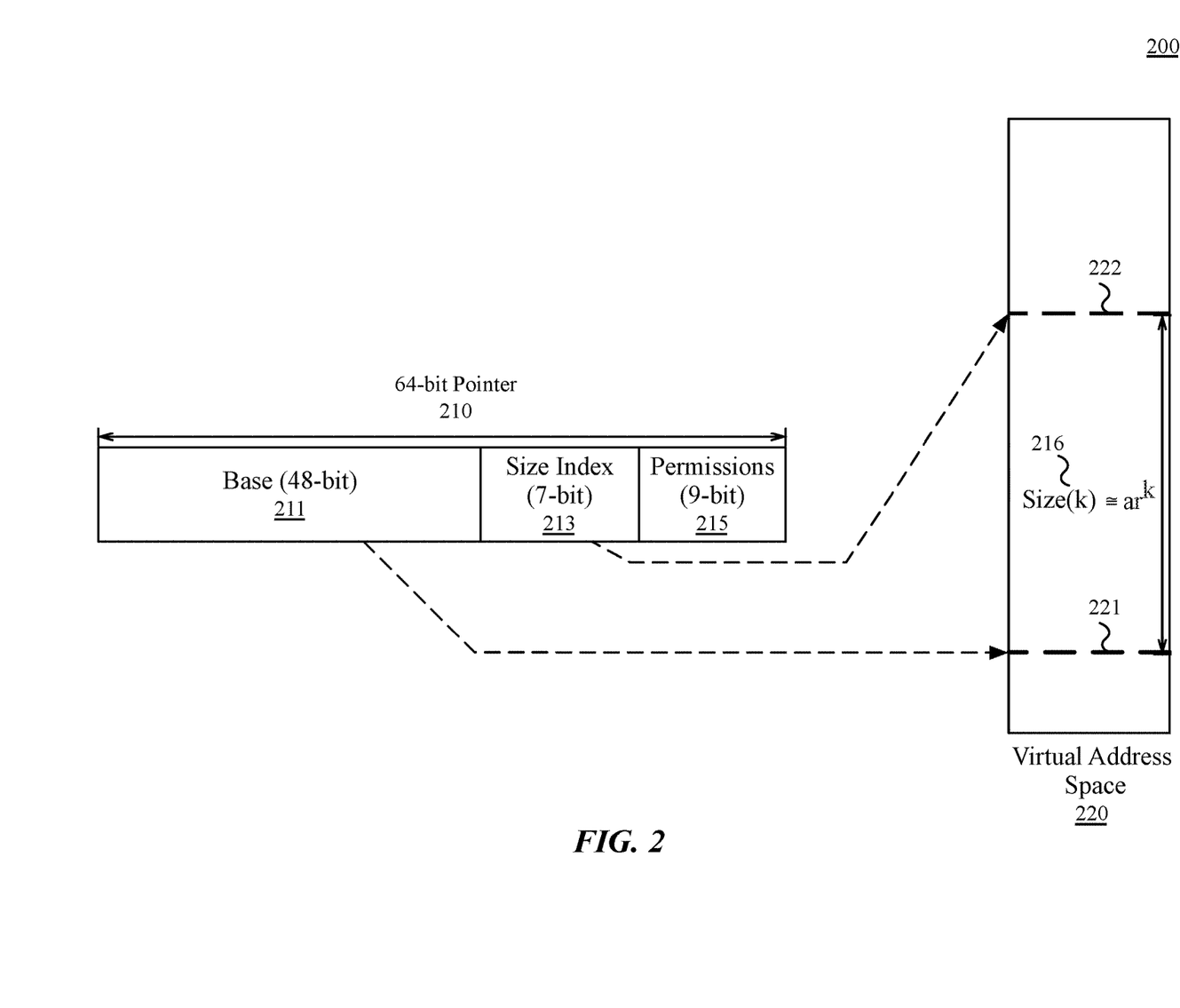
FIG. 2 illustrates a geometric 64-bit pointer system, according to an embodiment.

FIG. 2 illustrates a geometric 64-bit capability pointer system 200, according to an embodiment. The geometric 64-bit capability pointer system 200 includes a 64-bit pointer 210 having a base address region 211 and a size index region 213. In one embodiment, the 64-bit pointer 210 additionally includes a permissions region 215. The base address region 211 is a 48-bit region that defines the base address (e.g., lower boundary 221) of a memory allocation within a virtual address space 220. Using 48-bits, rather than 64-bit, for the base address region does not significantly reduce the amount of addressable memory available to the geometric 64-bit capability pointer system 200 relative to conventional 64-bit addressing systems. A processing system having 64-bit addresses is unlikely to require the entire 64 address bits. Accordingly, 64-bit processors can only physically address 48 bits of address space.

In one embodiment, 16 bits made available by the use of a 48-bit base address can be divided between the size index region 213 and the permissions region 215. In the illustrated embodiment, 7 bits are used to specify a size of a memory allocation associated with the 64-bit pointer 210, while 9-bits are used to specify permissions. In various embodiments, different ratios of size index bits and permission bits can be used. One embodiment does not include a permissions region 215 and dedicates 16-bits to a size index region 213.

In one embodiment, the size index region 213 specifies an allocation size within an index of allocation sizes. The selected size can be used to specify an upper boundary 222 for memory addresses in a virtual address space 220 that can be accessed via the 64-bit pointer. In one embodiment, during a load or store operation performed using the 64-bit pointer, the lower boundary 221 and upper boundary 222 can be checked to determine if a given virtual memory address is accessible. If a given virtual memory address is accessible, the type of access can be checked against permissions defined in a permissions region 215 for the 64-bit pointer 210.

A permissions region 215 can be used in some embodiments to specify the access permissions associated with an allocation that is addressed by the 64-bit pointer 210. The number of distinct permissions that can be defined can vary, depending on the ratio between size index bits and permission bits. The specific permissions can vary across embodiments, with exemplary permissions including execute, store, load, and call. The execute permission can enable executable instructions referenced by the 64-bit pointer 210 to be executed by a processor associated with the geometric 64-bit capability pointer system 200. The store permission allows the 64-bit pointer 210 to be used to store (e.g., write) data from general purpose registers. The load permission allows the 64-bit pointer 210 to be used to load (e.g., read) data from memory into general purpose registers. The call permission allows the 64-bit pointer 210 to be used as a direct function call. Additionally, permissions can be configured to determine whether a pointer can be used to load or store other permission or capability enabled pointers. In one embodiment, the permissions can be configured to restrict the ability of the 64-bit pointer to be used to reference memory storing other permissioned or capability enhanced pointers.

The size index region 213 specifies an allocation size within an index of allocation sizes, where the allocation size 216 at index k is approximately equal to $ar^k$, where a is a first term value, r is a common ratio, and k specifies the term in the sequence. The allocation sizes follow a geometric sequence of increasing allocation sizes. In one embodiment, a sequence of sizes is defined using a common ratio of 1.4, although other common ratios can be used. In one embodiment, the common ratio by which memory allocations are defined can be configurable on a processor via system firmware or can be configured at the operating system level, with memory allocation and memory handling libraries loading the ratio at initialization time. In one embodiment, a specific geometric sequence for allocation sizes can be determined experimentally based on a statistical analysis of memory allocation trends for a given data processing system. In one embodiment, each allocation size of the geometric sequences can be aligned to a specific boundary. Where program code is to perform a memory allocation, the memory allocator within a system can select an allocation size that is one step greater than the requested allocation size when returning an instance of the 64-bit pointer 210, with additional virtual memory optimization techniques applied to recapture and remap unused memory.

Figure 3:
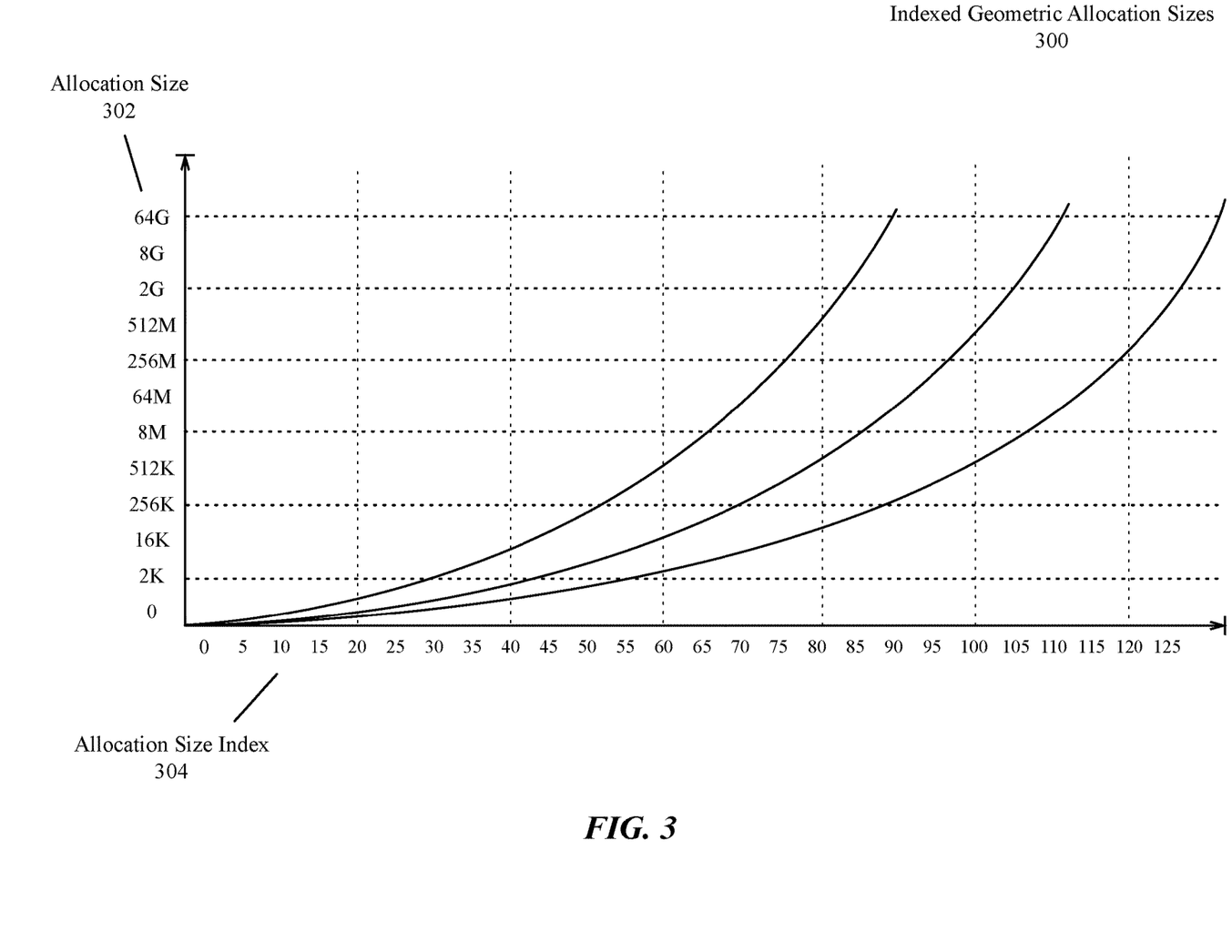
FIG. 3 illustrates exemplary indexed geometric allocation sizes, according to an embodiment.

FIG. 3 illustrates exemplary indexed geometric allocation sizes 300, according to an embodiment. In one embodiment, a kernel mode memory allocator can perform an allocation for a block of memory of a given allocation size 302 and encode an allocation size index 304 for the allocation in a size index region 213 as in FIG. 2. The allocation sizes can follow a geometric sequence of increasing allocation sizes. In various embodiments, different allocation size curves 306A, 306B, 306C can be configured. The specific parameters may be fixed for a given implementation, such that the hardware, memory allocator, and application software should agree on the specific allocation size curve for memory protection to function properly. However, parameters to be selected for a given system can be determined experimentally. In one embodiment, software-based implementations of memory protection can be enabled that allow some degree of live tuning to be implemented in the indexed geometric allocation sizes 300 across system boot sessions.

Figure 4:
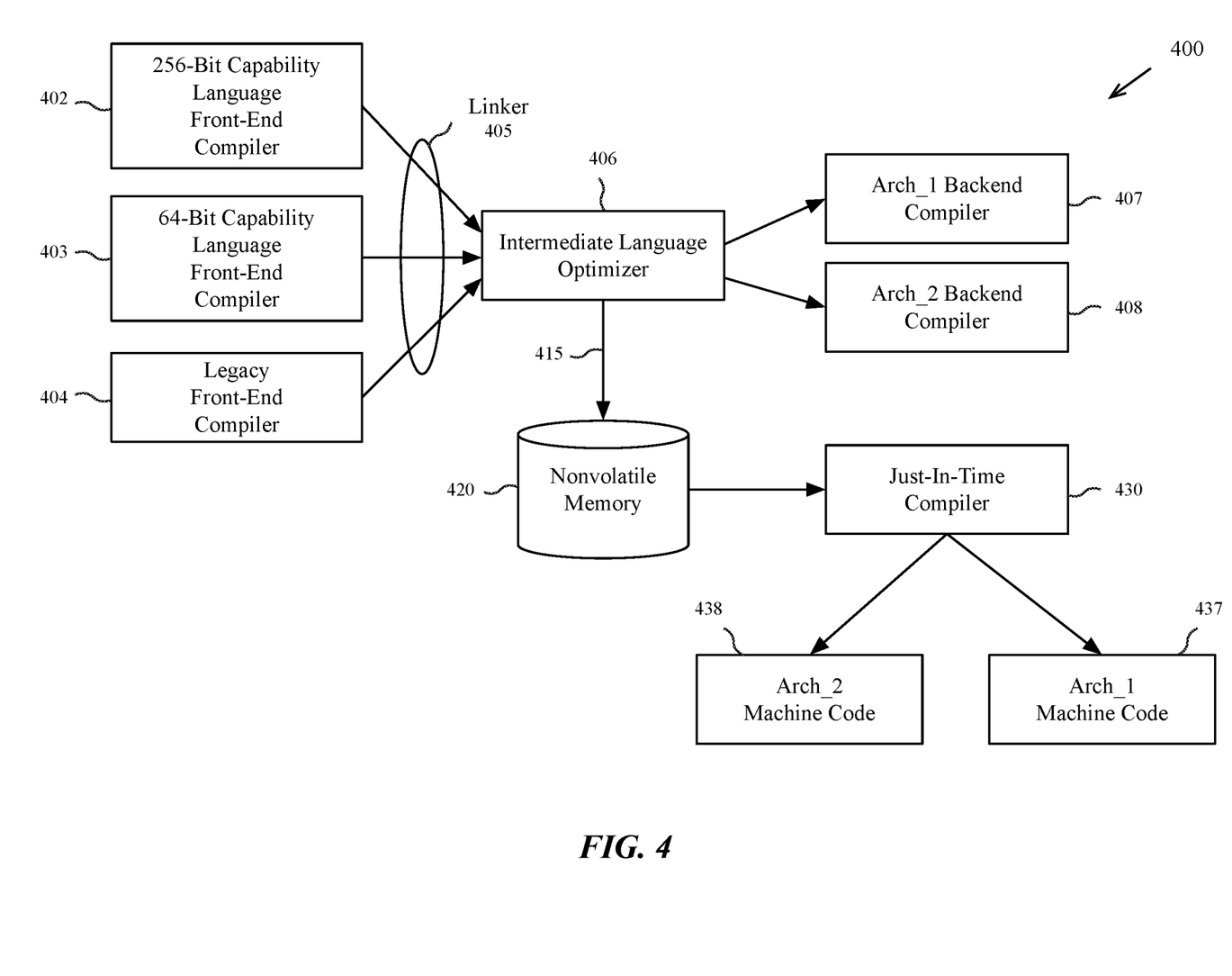
FIG. 4 is a block diagram illustrating a compiler system that can be used to enable 256-bit capability languages to interoperate with 64-bit capability languages, according to an embodiment.

FIG. 4 is a block diagram illustrating a modular compiler system 400 that can be used to enable 256-bit capability languages to interoperate with 64-bit capability languages, according to an embodiment. In one embodiment, the modular compiler system 400 includes multiple front-end compilers, including a first front-end compiler 402 having support for a 256-bit capability language and a second front-end compiler 403 having support for a 64-bit capability language front-end compiler. Additionally, a legacy front-end compiler 404 can be used to compile a high-level language without capability support. Each of the multiple front-end compilers can convert source code written in a particular high-level language into a common intermediate representation, such as, for example, the LLVM intermediate representation. A linker 405 can link function and object references between the code modules compiled by the front-end compilers. An intermediate language optimizer 406 can then perform cross-language optimization on the intermediate representation. In one embodiment, the intermediate language optimizer 406, based on one or more requested compile-time optimizations, performs one or more additional link-time optimizations on the resulting intermediate representations output by the multiple front-end compilers. (e.g., cross-module dead code stripping, etc.). Thus, multiple software modules written in multiple high-level source code languages can be optimized at a common point and then cross-optimized, even though the module were each coded in different high-level languages.

The intermediate representation can be stored in a text-based intermediate language or converted into a bit-code representation. The intermediate representation can then be converted by one or more back-end compilers into a machine-language format that is specific to a particular processor architecture. For example, a back-end compiler 407 for a first architecture can be used to compile machine code for execution on processors having capability support, while a back-end compiler 408 for a second architecture can be used to compile machine code for execution on processors without capability support. For processors without capability support, a subset of the capability protections may be implemented in software via an operating system library. For example, a pointer library can provide a pointer class that implements the regions of the 64-bit pointer 210 as in FIG. 2. Back-end support for such functionality can be implemented via operating system libraries or can be implemented within the hardware of a processor that executes the compiled instructions.

In one embodiment, an optimized intermediate representation can be stored in a binary format in nonvolatile memory 420 of a data processing system for later use. When functions defined in the intermediate language are referenced at runtime, any function that has not yet been converted to architecture specific machine code can be compiled by a just-in-time compiler 430 into machine code for an architecture supported by the compilation system, such as machine code 437 for a first architecture having hardware support for pointer capabilities, or machine code 438 for a second architecture that does not have support for pointer capabilities.

Figure 5:
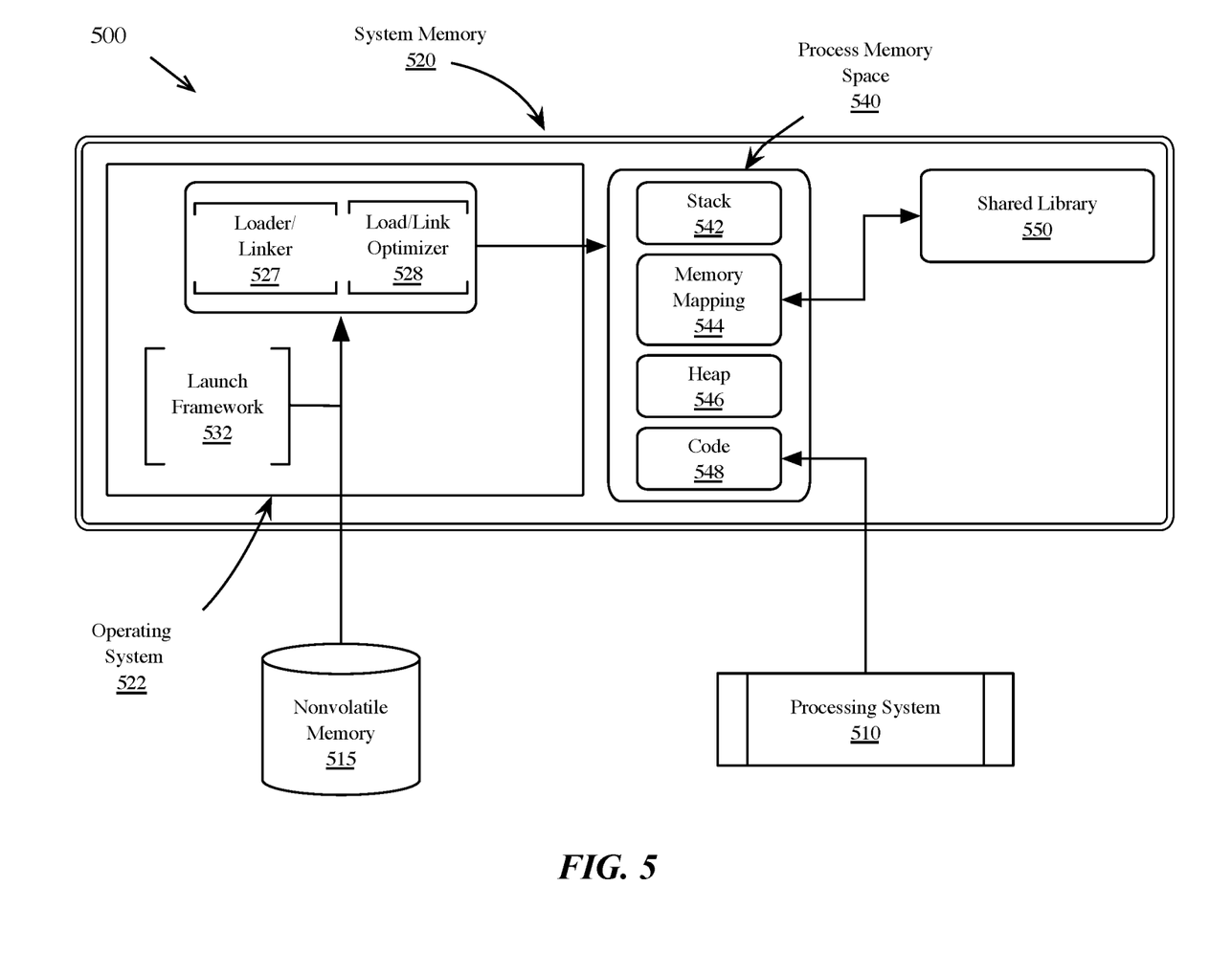
FIG. 5 is a block diagram of a system runtime environment of a data processing system, according to an embodiment.

FIG. 5 is a block diagram of a system runtime environment 500 of a data processing system, according to an embodiment. The data processing system contains a processing system 510 including one or more processors having support for the 64-bit geometric capability pointer as described herein, and can additionally include at least one processor having support for the 256-bit capability pointer system. The processing system 510 can direct an operating system 522 stored in system memory 520 to load an application developed via a capability aware programming language or a legacy programming language. The manner in which memory accesses for the application can vary depending on whether the type of capability system supported.

In one embodiment, the operating system 522 has an application launch framework 532, which launches applications stored in the nonvolatile memory 515 of the data processing system. In one embodiment, the operating system 522 includes a loader/linker 527 having a load/link optimizer 528 to perform additional link-time and load-time optimizations while loading components of the application into process memory space 540. An example link-time optimization is to bypass the loading of a program function if the function is not called by any other function (e.g., the linker does not resolve any symbols to the function). Should the function become relevant at a later time, the loader/linker 527 may load the function in memory. In one embodiment, some modules can be stored as bit-code on nonvolatile memory 515 and a final conversion to machine code is deferred until the module is required by other components of an application. The bit-code can then be compiled by a just-in-time compiler (e.g., just-in-time compiler 430 as in FIG. 4) and loaded into process memory space 540.

The process memory space 540 can include runtime components of an application, including a stack segment 542, a heap segment 546, and a code segment 548. In one embodiment, the runtime environment includes a virtual memory system that allows an address space in nonvolatile memory 515 to be mapped into system memory 520. In particular, the code segment 548 of the application can be loaded via a virtual memory mapping from nonvolatile memory 515. Once loaded, the processing system 510 can execute the compiled instructions in the code segment 548.

In one embodiment, the process memory space 540 includes one or more memory mappings 544 from other areas of system memory 520, including memory spaces assigned to other applications or processes. For example, a shared library 550 provided by the system can be loaded into memory and mapped into a memory mapping 544 in the process memory space of an application. The shared library 550, in one embodiment, can provide classes or functions to facilitate capability pointer functionality to an application in system memory 520 when such functionality is supported by the processing system 510. In one embodiment, the shared library 550 can facilitate the emulation of 64-bit geographic capability pointer functionality where such functionality is not supported by the processing system 510.

Figure 6:
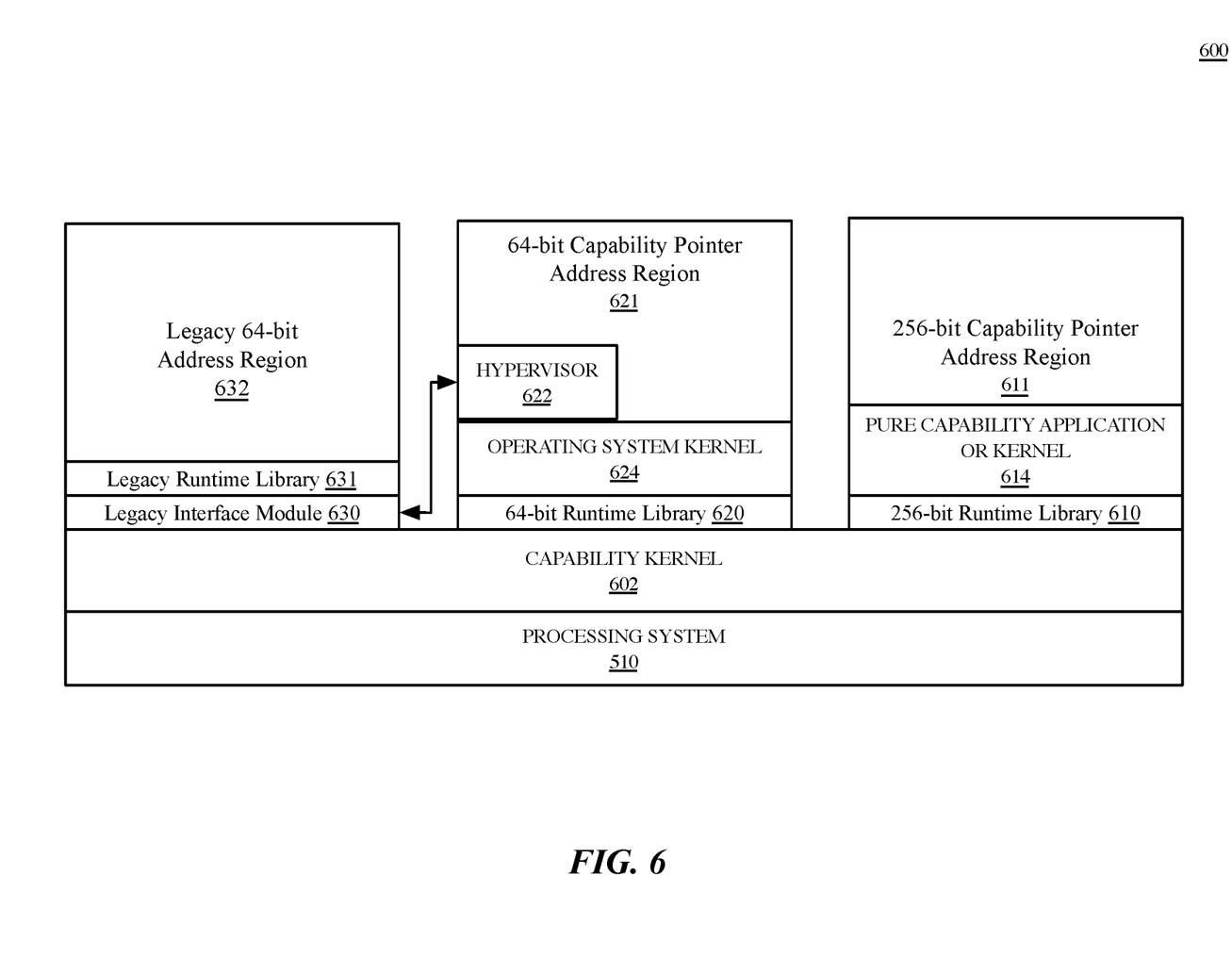
FIG. 6 illustrates a capability architecture, according to embodiments described herein.

FIG. 6 illustrates a capability architecture 600, according to embodiments described herein. In one embodiment, the capability architecture 600 enables a hybrid memory access system in which software that is compiled for 256-bit capability pointers can interact with software compiled for 64-bit capability pointers and legacy software without support for memory access capability restrictions. The capability architecture 600 can include a processing system 510, such as the processing system 510 of FIG. 5.

In one embodiment, the processing system 510 can include multiple processors cores, with one or more cores having support for 256-bit capability pointers, while one or more cores have support for geometric 64-bit capability pointers. The processing system 510 can include processors having support for a variety of instruction set architectures and is not limited to any specific class of instruction set architectures. For example, while the processing system can include support for a capability enhanced RISC instruction set, support for capability pointers and/or "fat" pointer objects can be applied to a variety of instruction set architectures or implemented as a software layer on non-capability aware processors.

The processing system 510 can execute software modules including a capability kernel 602, a 256-bit runtime library 610, a 64-bit runtime library 620, and a legacy interface module 630. The 256-bit runtime library 610 and 64-bit runtime library 620 are capability aware libraries that enable the creation of a 256-bit capability pointer address region 611 and 64-bit capability pointer address region 621 within a system memory address space. A hypervisor 622 in the 64-bit capability pointer address region 621 can interact with the legacy interface module 630 to enable a legacy runtime library 631 (e.g., non-capability aware runtime) executing in a legacy 64-bit address region 642. An operating system kernel 624 can execute in the 64-bit capability pointer address region 621 and interact with the capability kernel 602 via the 64-bit runtime library 620. Applications executing in the legacy 64-bit address region 632 can be restricted to executing in a specific subset of address ranges, with access to those addresses mediated via the hypervisor 622, which is configured with support for 64-bit capability pointers.

In the illustrated capability architecture 600, where the processing system 510 includes at least one processor having support for the 256-bit capability pointer, security sensitive programs can be executed in the 256-bit capability pointer address region 611. For example, a pure capability application or kernel 614 can execute in the 256-bit capability pointer address region 611 and interact with the capability kernel 602 via the 256-bit runtime library 610.

Figure 7:
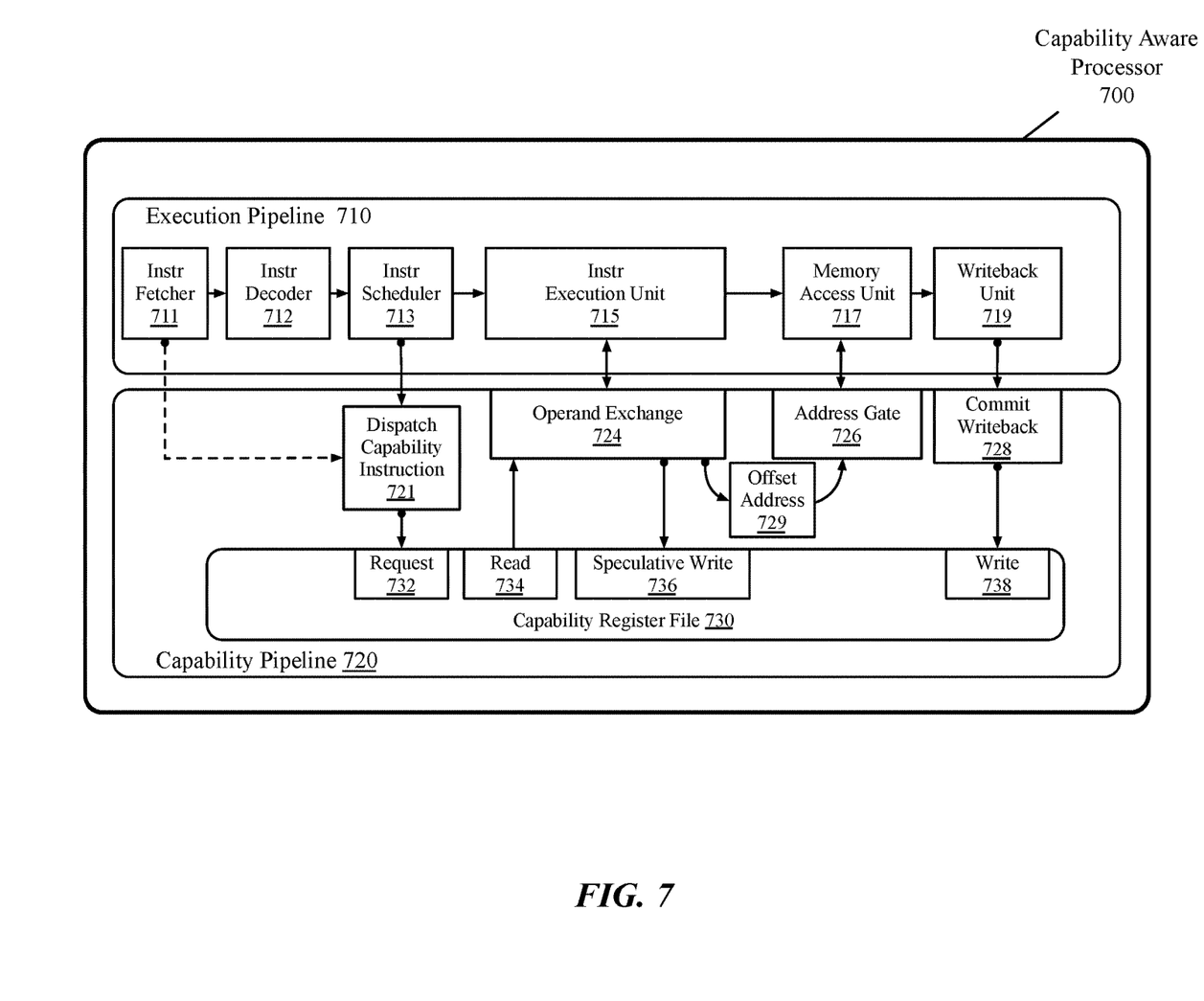
FIG. 7 illustrates a capability aware processor, according to an embodiment.

FIG. 7 illustrates a capability aware processor 700, according to an embodiment. In one embodiment, the capability aware processor 700 includes support for the geometric 64-bit capability pointer described herein. In one embodiment, the geometric 64-bit capability pointer described herein can be implemented via software libraries on a processor having support for the 256-bit capability pointer. In some embodiments, the capability aware processor 700 can be a processor within the processing system 510 of FIG. 5 and FIG. 6.

Capability functionality can be implemented via a capability pipeline 720, which performs operations in concert with an execution pipeline 710 of the capability aware processor 700. The capability pipeline 720 can include a capability register file 730 that can contain capability registers that can be used to limit the capabilities associated with a given memory access request. In one embodiment, all data accesses can be gated by capability registers. In one embodiment, instruction fetches can also be gated or offset based on a capability register. Access to the memory management unit or memory controller can be prevented unless capability register data is present for a given memory access.

The execution pipeline 710 includes an instruction fetcher 711, instruction decoder 712, instruction scheduler 713, an instruction execution unit 715, a memory access unit 717, and a writeback unit 719. The specific elements of the execution pipeline 710 are exemplary. In various embodiments, additional units may be present or specific units can be combined. Additionally, in some embodiments the instruction decoder 712 can be position after the instruction scheduler 713. In addition to interacting with the capability pipeline 720, the elements of the execution pipeline 710 can perform operations in accordance with processor elements known in the art.

During operating an instruction fetcher 711 within the execution pipeline 710 can fetch an instruction for execution. In one embodiment, the instruction fetcher 711 can access an instruction cache containing pre-fetched instructions without requiring the use of a capability register. In one embodiment, the instruction fetcher 711 can be gated by the capability system and can trigger a dispatch of a capability instruction 721 to enable the instruction fetcher to access an instruction in memory or an instruction cache line associated with a memory address. The instruction decoder 712 can decode the fetched instruction and the instruction scheduler 713 can schedule the instruction for execution. The instruction scheduler 713 can dispatched a capability instruction 721 to the capability pipeline. The capability instruction can place a memory access request into the capability register file. If the appropriate capabilities are present, a read 734 can be performed based on the request 732, with the results of the read provided to the instruction execution unit 715 by during an operand exchange performed by an operand exchange unit 724. As a result of the operand exchange, any speculative writes 736 that may be performed by the instruction execution unit 715 can be stored within the capability register file 730.

In one embodiment, an offset address 729 to a memory address to be accessed by the memory access unit 717 can be provided to an address gate unit 726, which can perform a memory access on behalf of the memory access unit 717 and provide data from the requested address to the memory access unit 717. The writeback unit 719 of the execution pipeline can perform a memory writeback via a commit writeback unit 728, which can write 738 data to be written to the capability register file. This data can be written to memory if allowed by the capabilities defined for the pointers used to access the memory.

Figure 8:
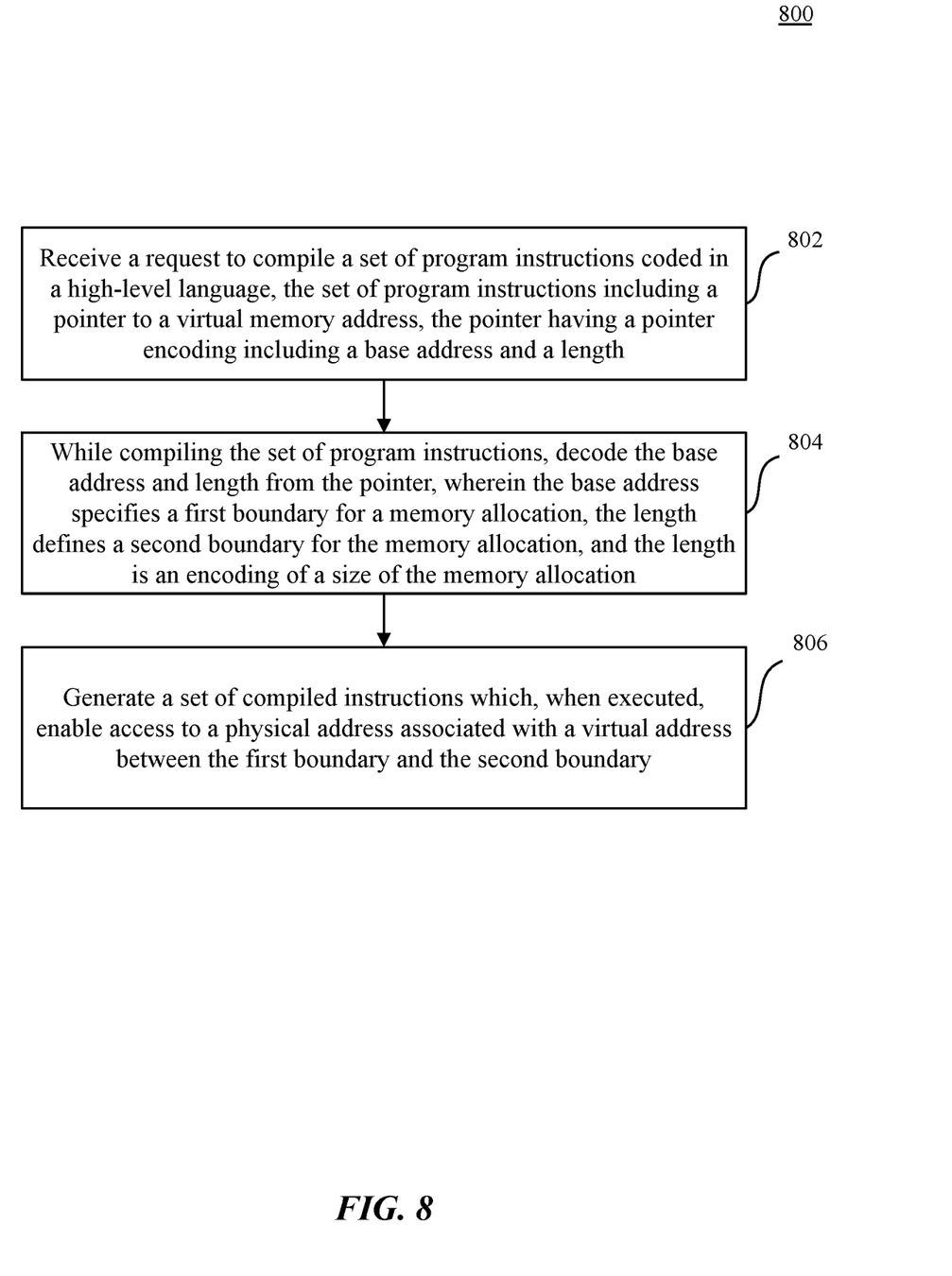
FIG. 8 is a flow diagram of logic operations of a capability aware compiler, according to an embodiment.

FIG. 8 is a flow diagram of logic operations 800 of a capability aware compiler, according to an embodiment. A compiler system, such as the modular compiler system 400 of FIG. 4, can compile high level program code into object and executable files containing instructions for execution on a capability aware processing system. The high-level program code can include classes or structures that define pointer encodings which enable the use of capability aware pointers within the program code. The illustrated logic operations can be performed by one or more processors. The one or more processors used to compile the program code are not required to be capability aware processors, and a non-capability aware processor can perform the illustrated operations.

As shown at block 802, the capability aware compiler can receive a request to compile a set of program instructions coded in a high-level language. The set of program instructions can include a pointer to a virtual memory address, the pointer having a pointer encoding including a base address and a length. The pointer encoding can be compatible with the geometric 64-bit capability pointer system 200 of FIG. 2, for example, where the base address corresponds to a 48-bit base address and the length is specified according to a size index of between 7 bits and 16 bits in length. The index can be used to index into a table of memory allocation sizes or as input into a function that outputs a memory size. In one embodiment, the pointer additionally includes permission bits to specify functionality (e.g., load, store, execute, call, etc.) that can be performed using the pointer.

As shown at block 804, while compiling the set of program instructions, the compiler can decode the base address and length from the pointer. In one embodiment, the base address specifies a first boundary for a memory allocation, the length defines a second boundary for the memory allocation, and the length is an encoding of a size of the memory allocation. The length is a reduced size representation of the length of the memory allocation, such that the amount of pointer space consumed by the length is less than if the length of the allocation is stored in an unencoded manner. For example, the length can be an encoded length that indexes to a table of allocation sizes, where the table of allocation sizes includes a set of allocation sizes that follows a geometric progression of allocation sizes. In one embodiment, the geometric progression of allocation sizes is a set of increasing allocation sizes. The table of allocation sizes can be stored in memory, such as a system memory and/or an on-chip memory of a processor. The table of allocation sizes, in one embodiment, can be encoded within hardware logic of a capability aware processor that is configured to natively execute code that includes geometric 64-bit capability pointers as described herein. In one embodiment, the length specifies an input into a function that outputs the actual length of the allocation. For example, the size index can specify a parameter k, where the specified length is approximately equal to $ar^k$, where a is a first term value, r is a common ratio, and k specifies the term in the sequence. The actual length, in one embodiment, can then be adjusted to conform with alignment requirements specified for the system. The length decode function can be performed in software or can be configured into hardware logic of a processor and/or memory controller associated with the processor.

As shown at block 806, the compiler can generate a set of compiled instructions which, when executed, enable access to a physical address associated with a virtual address between the first boundary and the second boundary. The access to the physical address can be gated by, for example, a capability pipeline 720 as in the capability aware processor 700 of FIG. 7. However, in one embodiment, a software library can be used to enable use of a geometric 64-bit capability pointer as described herein on processing systems without hardware support for capability-based memory access. Alternatively, use of the geometric 64-bit capability pointer as described herein can be enabled by a software library for program code executing on a processing system having support for a 256-bit capability pointer.

Figure 9:
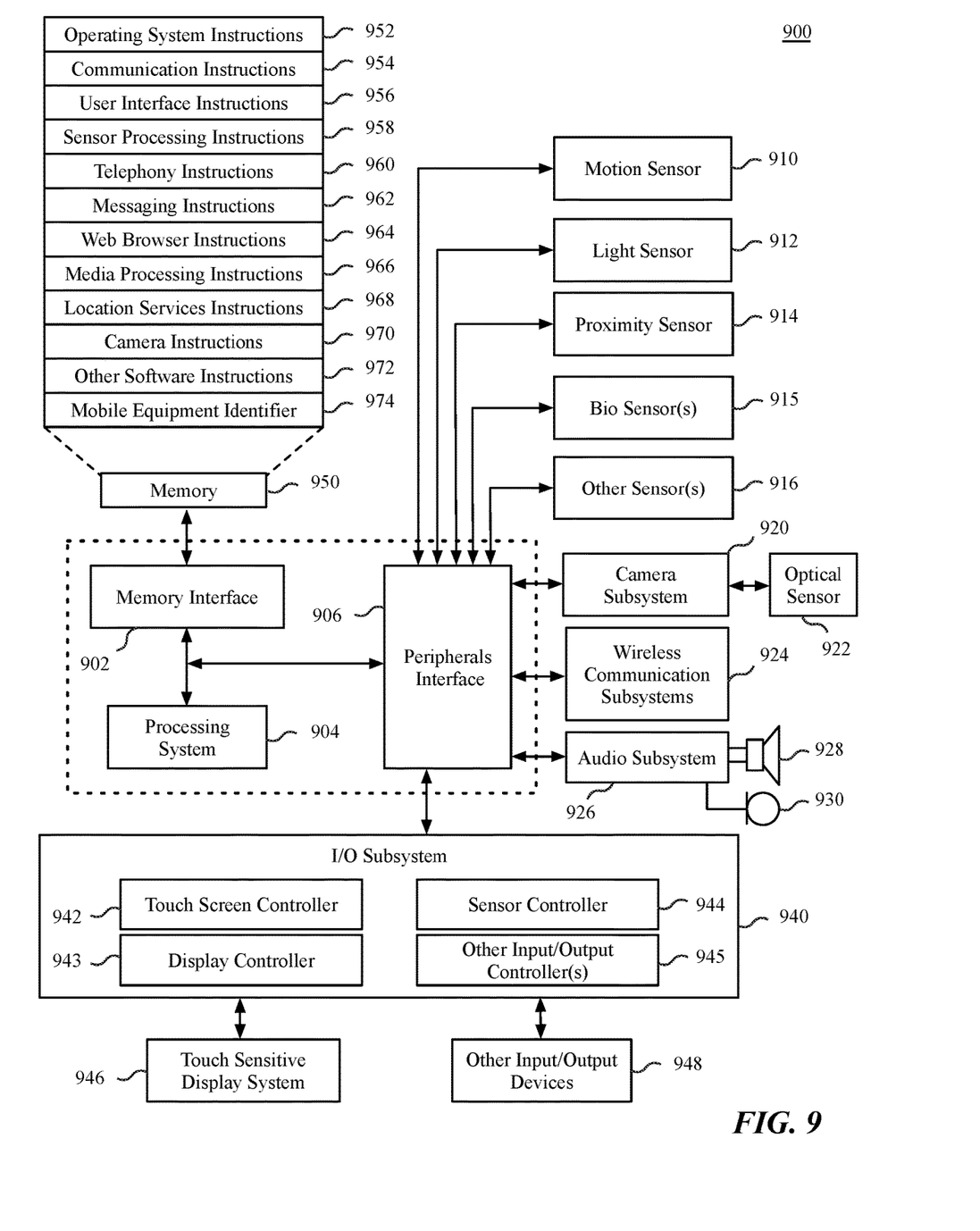
FIG. 9 is a block diagram of a device architecture for an electronic device that can implement capability pointers as described herein.

FIG. 9 is a block diagram of a device architecture 900 for an electronic device that can implement capability pointers as described herein. The device architecture 900 includes a memory interface 902, a processing system 904 including one or more data processors, image processors and/or graphics processing units, and a peripherals interface 906. The various components can be coupled by one or more communication buses or signal lines. The various components can be separate logical components or devices or can be integrated in one or more integrated circuits, such as in a system on a chip integrated circuit. The memory interface 902 can be coupled to memory 950, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate the mobile device functionality. One or more biometric sensor(s) 915 may also be present, such as a fingerprint scanner for fingerprint recognition or an image sensor for facial recognition. Other sensors 916 can also be connected to the peripherals interface 906, such as a positioning system (e.g., GPS receiver), a temperature sensor, or other sensing device, to facilitate related functionalities. A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 924, which can include radio frequency receivers and transmitters and/or optical (e.g., infrared) receivers and transmitters. The specific design and implementation of the wireless communication subsystems 924 can depend on the communication network(s) over which a mobile device is intended to operate. For example, a mobile device including the illustrated device architecture 900 can include wireless communication subsystems 924 designed to operate over a GSM network, a CDMA network, an LTE network, a Wi-Fi network, a Bluetooth network, or any other wireless network. The wireless communication subsystems 924 can provide a communications mechanism over which a media playback application can retrieve resources from a remote media server or scheduled events from a remote calendar or event server.

An audio subsystem 926 can be coupled to a speaker 928 and a microphone 930 to facilitate voice-enabled functions, such as voice recognition, voice replication, digital recording, and telephony functions. In some electronic devices, the audio subsystem 926 can be a high-quality audio system including support for virtual surround sound.

The I/O subsystem 940 can include a touch screen controller 942 and/or other input controller(s) 945. For computing devices including a display device, the touch screen controller 942 can be coupled to a touch sensitive display system 946 (e.g., touch-screen). The touch sensitive display system 946 and touch screen controller 942 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 946. Display output for the touch sensitive display system 946 can be generated by a display controller 943. In one embodiment, the display controller 943 can provide frame data to the touch sensitive display system 946 at a variable frame rate.

In one embodiment, a sensor controller 944 is included to monitor, control, and/or processes data received from one or more of the motion sensor 910, light sensor 912, proximity sensor 914, or other sensors 916. The sensor controller 944 can include logic to interpret sensor data to determine the occurrence of one of more motion events or activities by analysis of the sensor data from the sensors.

In one embodiment, the I/O subsystem 940 includes other input controller(s) 945 that can be coupled to other input/ control devices 948, such as one or more buttons, rocker switches, thumb-wheel, infrared port, USB port, and/or a pointer device such as a stylus, or control devices such as an up/down button for volume control of the speaker 928 and/or the microphone 930.

In one embodiment, the memory 950 coupled to the memory interface 902 can store instructions for an operating system 952, including portable operating system interface (POSIX) compliant and non-compliant operating system or an embedded operating system. The operating system 952 may include instructions for handling basic system services and for performing hardware dependent tasks. In some implementations, the operating system 952 can include an operating system kernel such as the operating system kernel 624 as in FIG. 6. Such kernel can operate in communication with the capability kernel 602 of FIG. 6.

The memory 950 can also store communication instructions 954 to facilitate communicating with one or more additional devices, one or more computers and/or one or more servers, for example, to retrieve web resources from remote web servers. The memory 950 can also include user interface instructions 956, including graphical user interface instructions to facilitate graphic user interface processing.

Additionally, the memory 950 can store sensor processing instructions 958 to facilitate sensor-related processing and functions; telephony instructions 960 to facilitate telephone-related processes and functions; messaging instructions 962 to facilitate electronic-messaging related processes and functions; web browser instructions 964 to facilitate web browsing-related processes and functions; media processing instructions 966 to facilitate media processing-related processes and functions; location services instructions including GPS and/or navigation instructions 968 and Wi-Fi based location instructions to facilitate location based functionality; camera instructions 970 to facilitate camera-related processes and functions; and/or other software instructions 972 to facilitate other processes and functions, e.g., security processes and functions, and processes and functions related to the systems. The memory 950 may also store other software instructions such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively. A mobile equipment identifier, such as an International Mobile Equipment Identity (IMEI) 974 or a similar hardware identifier can also be stored in memory 950.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions may be implemented in hardware and/or in software, including in one or more signal processing and/or application specific integrated circuits.

Figure 10:
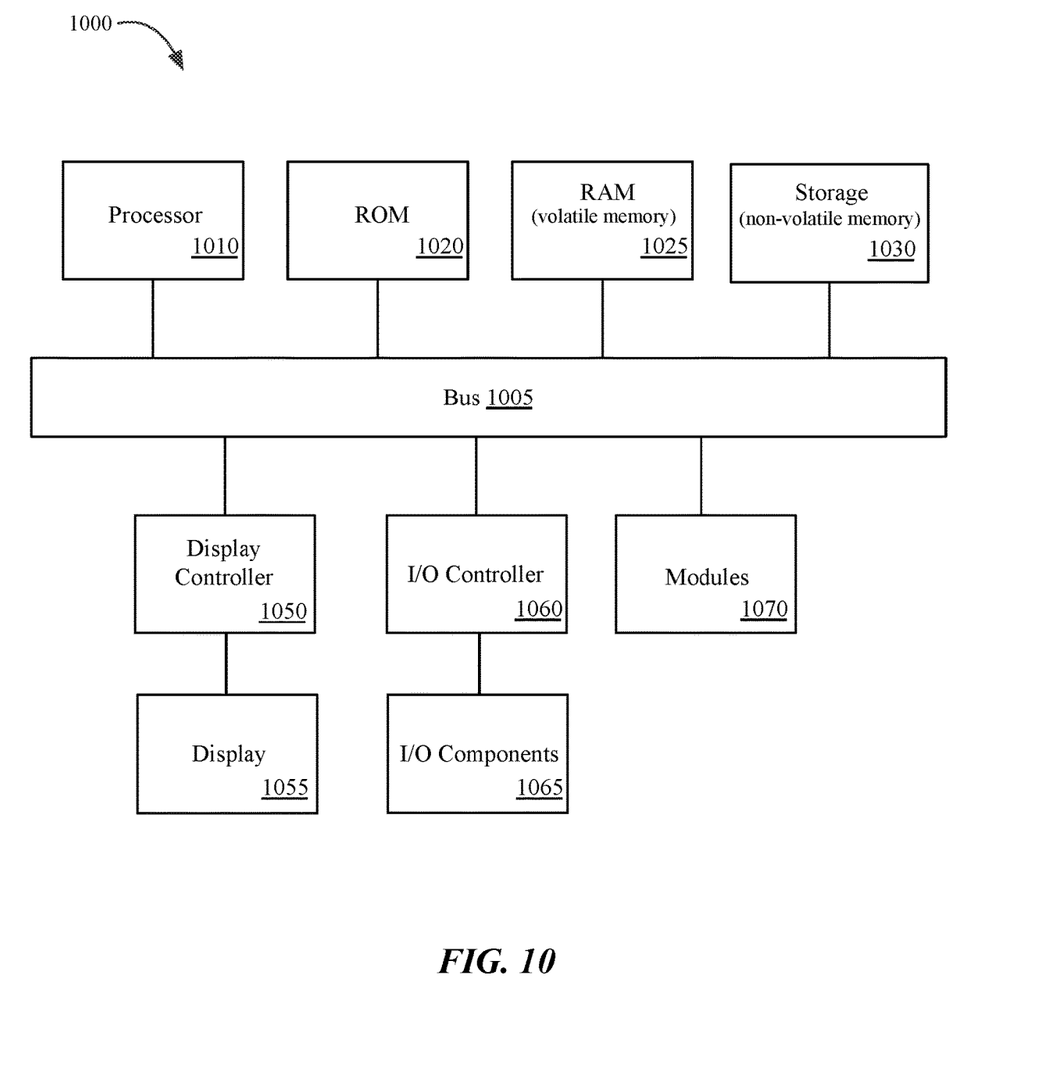
FIG. 10 is a block diagram illustrating a computing system that can be used in conjunction with one or more of the embodiments described herein.

FIG. 10 is a block diagram illustrating a computing system 1000 that can be used in conjunction with one or more of the embodiments described herein. The illustrated computing system 1000 can represent any of the devices or systems described herein that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1000 can include a bus 1005 which can be coupled to a processor 1010, ROM 1020 (Read Only Memory), RAM 1025 (Random Access Memory), and storage 1030 (e.g., non-volatile memory). The processor 1010 can retrieve stored instructions from one or more of the memories (e.g., ROM 1020, RAM 1025, and storage 1030) and execute the instructions to perform processes, operations, or methods described herein. The processor 1010 can be a capability aware processor, such as the capability aware processor 700 as in FIG. 7. These memories represent examples of a non-transitory machine-readable medium (or computer-readable medium) or storage containing instructions which when executed by a computing system (or a processor), cause the computing system (or processor) to perform operations, processes, or methods described herein. The RAM 1025 can be implemented as, for example, dynamic RAM (DRAM), or other types of memory that require power continually to refresh or maintain the data in the memory. Storage 1030 can include, for example, magnetic, semiconductor, tape, optical, removable, non-removable, and other types of storage that maintain data even after power is removed from the system. It should be appreciated that storage 1030 can be remote from the system (e.g. accessible via a network).

A display controller 1050 can be coupled to the bus 1005 to receive display data to be displayed on a display device 1055, which can display any one of the user interface features or embodiments described herein and can be a local or a remote display device. The computing system 1000 can also include one or more input/output (I/O) components 1065 including mice, keyboards, touch screen, network interfaces, printers, speakers, and other devices, which can be coupled to the system via an I/O controller 1060.

Modules 1070 (or components, units, functions, or logic) can represent any of the functions or engines described above, such as, for example, the capability kernel 602 as in FIG. 6. Modules 1070 can reside, completely or at least partially, within the memories described above, or within a processor during execution thereof by the computing system. In addition, modules 1070 can be implemented as software, firmware, or functional circuitry within the computing system, or as combinations thereof.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide hardware and software logic to enable a capability enhanced data processing system in which access to memory allocations are checked against a set of capabilities defined for the memory allocation. Capability enhanced pointers having a reduced size relative to existing capability enhanced RISC systems by encoding the size of the allocated memory region in a reduce number of bits.

One embodiment provides for a computer-implemented method comprising receiving a request to compile a set of program instructions coded in a high-level language, the set of program instructions including a pointer to a virtual memory address, the pointer having a pointer encoding including a base address and a length; while compiling the set of program instructions, decoding the base address and length from the pointer, wherein the base address specifies a first boundary for a memory allocation, the length defines a second boundary for the memory allocation and the length is an encoding of a size of the memory allocation; and generating a set of compiled instructions which, when executed, enable access to a physical address associated with a virtual address between the first boundary and the second boundary.

One embodiment provides for data processing system comprising a non-transitory machine-readable medium storing a first set of instructions one or more processors to execute the first set of instructions, wherein the first set of instructions, when executed, cause the one or more processors to perform operations including receiving a request to compile a second set of instructions coded in a high-level language, wherein the second set of instructions include a pointer to a virtual memory address, the pointer having a pointer encoding including a base address and a length; while compiling the second set of instructions, decoding the base address and length from the pointer, wherein the base address specifies a first boundary for a memory allocation, the length defines a second boundary for the memory allocation, and the length is an encoding of a size of the memory allocation; and generating a set of compiled instructions which, when executed, enable access to a physical address associated with a virtual address between the first boundary and the second boundary.

One embodiment provides for a computing device comprising a memory device coupled with a bus and one or more processors coupled with the bus. At least one of the one or more processors includes an execution pipeline and a capability pipeline, the capability pipeline to control access to data stored in the memory device for an instruction configured to execute on the at least one processor, the instruction compiled to access the memory device based on a 64-bit pointer having a pointer encoding including a base address and a length, the base address to specify a first permitted boundary for a memory allocation based on the pointer and the length to specify a second boundary for the memory allocation based on the pointer, the length including an encoding of a size of the memory allocation.

Other features of the present embodiments will be apparent from the drawings and from the detailed description above. While the embodiments have been described in connection with examples thereof, the true scope of the embodiments should not be so limited since other modifications will become apparent to the skilled practitioner upon a study of the drawings, specification, and following claims.

What is claimed is:

1. A computer-implemented method comprising:
   receiving a request to compile a set of program instructions coded in a high-level language, the set of program instructions including a pointer to a virtual memory address, the pointer having a 64-bit pointer encoding including a base address and a length;
   while compiling the set of program instructions, decoding the base address and length from the pointer, wherein the base address specifies a first boundary for a memory allocation, the length defines a second boundary for the memory allocation, the length is an encoding of a size of the memory allocation, the length is encoded as an index to a table of memory allocation sizes, and the table of memory allocation sizes is encoded into hardware of a processor configured to execute the compiled set of program instructions; and
   generating a set of compiled instructions which, when executed, enable access to a physical address associated with a virtual address between the first boundary and the second boundary.

2. The computer-implemented method as in claim 1, wherein the length is one of a geometric progression of allocation sizes.

3. The computer-implemented method as in claim 1, wherein the 64-bit pointer encoding additionally includes a set of permissions associated with the pointer.

4. The computer-implemented method as in claim 3, wherein the set of permissions define a set of memory accesses permitted via the pointer.

5. The computer-implemented method as in claim 4, wherein generating the set of compiled instructions additionally includes generating one or more instructions to limit a type of memory access available via the pointer.

6. The computer-implemented method as in claim 5, wherein the type of memory access available to the pointer include load, store, execute, and call.

7. A data processing system comprising:
a non-transitory machine-readable medium storing a first set of instructions;
one or more processors to execute the first set of instructions, wherein the first set of instructions, when executed, cause the one or more processors to perform operations including:
receiving a request to compile a second set of instructions coded in a high-level language, wherein the second set of instructions include a pointer to a virtual memory address, the pointer having a 64-bit pointer encoding including a base address and a length;
while compiling the second set of instructions, decoding the base address and length from the pointer, wherein the base address specifies a first boundary for a memory allocation, the length defines a second boundary for the memory allocation, the length is an encoding of a size of the memory allocation, the length is encoded as an index to a table of memory allocation sizes, and the table of memory allocation sizes is encoded into hardware of a processor configured to execute the compiled second set of instructions; and
generating a set of compiled instructions which, when executed, enable access to a physical address associated with a virtual address between the first boundary and the second boundary.

8. The data processing system as in claim 7, wherein the length is one of a geometric progression of allocation sizes.

9. The data processing system as in claim 7, wherein the 64-bit pointer encoding additionally includes a set of permissions associated with the pointer.

10. The data processing system as in claim 9, wherein the set of permissions define a set of memory accesses allowed via the pointer.

11. The data processing system as in claim 10, wherein generating the set of compiled instructions additionally includes generating one or more instructions to limit a type of memory access permitted via the pointer.

12. The data processing system as in claim 11, wherein the type of memory access available to the pointer include load, store, execute, and call.

13. A computing device comprising:
a memory device coupled with a bus; and
one or more processors coupled with the bus, at least one of the one or more processors including an execution pipeline and a capability pipeline, the capability pipeline to control access to data stored in the memory device for an instruction configured to execute on the at least one of the one or more processors, the instruction compiled to access the memory device based on a pointer having a 64-bit pointer encoding including a base address and a length, the base address to specify a first boundary for a memory allocation and the length to specify a second boundary for the memory allocation, the length including an encoding of a size of the memory allocation, wherein the length is encoded as an index to a table of memory allocation sizes, the table of memory allocation sizes is encoded into hardware of at least one of the one or more processors, and at least one of the one or more processors is to decode the length from the table of memory allocation sizes.

14. The computing device as in claim 13, wherein the length is one of a geometric progression of allocation sizes.

15. The computing device as in claim 13, the 64-bit pointer encoding additionally including a set of permissions associated with the pointer.

16. The computing device as in claim 15, the set of permissions to define a set of memory accesses that permitted via the pointer.

17. The computing device as in claim 16, the at least one of the one or more processors to execute and instruction via the capability pipeline, the instruction to limit a type of memory access available via the pointer.

* * * * *